US012375361B2

(12) United States Patent
Zhou

(10) Patent No.: US 12,375,361 B2
(45) Date of Patent: Jul. 29, 2025

(54) METHOD AND DEVICE FOR GENERATING SIMULATION DATA, COMPUTER DEVICE AND STORAGE MEDIUM

(71) Applicant: Black Sesame Technologies (Shanghai) Co., Ltd., Shanghai (CN)

(72) Inventor: Zhi Zhou, Chengdu (CN)

(73) Assignee: Black Sesame Technologies (Shanghai) Co., Ltd. (CN)

( * ) Notice: Subject to any disclaimer, the term of this patent is extended or adjusted under 35 U.S.C. 154(b) by 14 days.

(21) Appl. No.: 18/368,751

(22) Filed: Sep. 15, 2023

(65) Prior Publication Data

US 2024/0097991 A1 Mar. 21, 2024

(30) Foreign Application Priority Data

Sep. 15, 2022 (CN) .......................... 202211124995.3

(51) Int. Cl.
*H04L 41/14* (2022.01)
*H04L 41/147* (2022.01)

(52) U.S. Cl.
CPC .......... *H04L 41/145* (2013.01); *H04L 41/147* (2013.01)

(58) Field of Classification Search
CPC ... H04L 43/50; H04L 1/24; H04L 1/00; H04L 41/145; H04L 43/08; H04L 43/00; H04L 43/55
See application file for complete search history.

(56) References Cited

U.S. PATENT DOCUMENTS

| | | | | |
|---|---|---|---|---|
| 7,342,897 B1* | 3/2008 | Nader | ..................... | H04L 43/50 370/401 |
| 7,843,843 B1* | 11/2010 | Papp, III | ............. | H04L 47/2475 370/395.42 |
| 10,666,775 B1* | 5/2020 | Volpe | ..................... | H04L 43/50 |
| 11,076,025 B1* | 7/2021 | Volpe | ..................... | H04L 43/106 |
| 11,529,916 B1* | 12/2022 | Karadeniz | ............. | G08C 15/06 |
| 2003/0012141 A1* | 1/2003 | Gerrevink | .............. | H04L 41/00 370/392 |
| 2005/0041592 A1* | 2/2005 | Hannel | ................. | H04L 41/145 370/241 |
| 2006/0045019 A1* | 3/2006 | Patzschke | .............. | H04L 43/50 370/241 |
| 2008/0198742 A1* | 8/2008 | Kaempfer | .............. | H04L 43/50 370/230 |

(Continued)

*Primary Examiner* — David R Lazaro
(74) *Attorney, Agent, or Firm* — Timothy T. Wang; Ni, Wang & Massand, PLLC

(57) ABSTRACT

A method and a device for generating simulation data, a computer device and a storage medium are provided. The method includes: receiving user input through a user interface, where the user input includes a data type parameter, a value parameter, a generation time parameter and a target interface parameter of data to be generated; searching for a pre-stored data template file corresponding to the data type parameter; generating a data packet queue based on the value parameter by using the data template file; and sending each data packet in the data packet queue to a target interface corresponding to the target interface parameter based on a sending moment specified by the generation time parameter. With this method, the cost of the test system can be reduced and the flexibility of available test data can be improved.

11 Claims, 8 Drawing Sheets

(56) References Cited

U.S. PATENT DOCUMENTS

| | | | |
|---|---|---|---|
| 2013/0077500 A1* | 3/2013 | Hutchison | H04L 43/50 |
| | | | 370/252 |
| 2013/0103940 A1* | 4/2013 | Badea | H04L 63/123 |
| | | | 713/160 |
| 2015/0049772 A1* | 2/2015 | Bergeron | H04L 43/50 |
| | | | 370/474 |
| 2017/0289824 A1* | 10/2017 | Figoli | H04W 76/15 |
| 2018/0013657 A1* | 1/2018 | Cantwell | H04L 43/08 |
| 2019/0102753 A1* | 4/2019 | Harrison | H04L 67/125 |
| 2020/0296007 A1* | 9/2020 | Finn, II | H04L 41/145 |
| 2020/0401504 A1* | 12/2020 | Sommers | G06F 11/3688 |
| 2021/0226880 A1* | 7/2021 | Ramamoorthy | H04L 41/40 |
| 2022/0229759 A1* | 7/2022 | Wang | G01S 19/23 |
| 2024/0097991 A1* | 3/2024 | Zhou | H04L 41/0843 |

\* cited by examiner

METHOD AND DEVICE FOR GENERATING SIMULATION DATA, COMPUTER DEVICE AND STORAGE MEDIUM

RELATED APPLICATION

This application claims the benefit under 35 U.S.C. § 119(a) of the filing date of Chinese Patent Application No. 202211124995.3, filed in the Chinese Patent Office on Sep. 15, 2022. The disclosure of the foregoing application is herein incorporated by reference in its entirety.

FIELD OF THE INVENTION

The present application relates to the technical field of data testing, and in particular to a method and a device for generating simulation data, a computer device and a storage medium.

BACKGROUND OF THE INVENTION

In the revolution from manual driving to unmanned automatic driving, the sensor functions as eyes of a self-driving vehicle, configured to acquires information about surroundings. The data fusion system functions as the brain of the self-driving vehicle, configured to calculate and analyze the data received from the eyes, so as to provide a basis for the next step to output commands (e.g., acceleration, braking, steering, etc.) to control the vehicle to move. Data fusion ability of the data fusion system directly affects the accuracy, reliability and timeliness of the system on target recognition.

Sensors commonly used in the field of autonomous driving include a camera, a lidar, an ultrasonic radar, a millimeter wave radar, etc. In the development of the self-driving vehicle, it is necessary to test the data fusion capability of the data fusion system. During the test, it is necessary to input data measured by various types of sensors into the tested data fusion system for testing.

In the traditional test solutions, various types of real sensors are connected to the data fusion system to obtain data from these sensors for testing the data fusion system. For example, as shown in FIG. 1, the lidar, the millimeter wave radar, the ultrasonic radar, and the camera are connected to the data fusion system under test for testing. However, a variety of data sensors such as the lidar, the millimeter wave radar and the ultrasonic radar are necessary in these solutions. The data formats of sensors from different manufacturers may be different, and a large number of sensor devices are necessary to perform compatibility testing, resulting in high costs.

In traditional testing solutions, data is generally acquired from sensors through data playback. The rate of data playback is limited by the recording rate, and the diversity of data is limited by the recording time and the diversity of recorded venues and spatial objects. Due to the large amount of data of some sensors, it is difficult to store data for a long time with the existing storage devices, resulting in limitations to test data.

Therefore, there is room for improvement in the traditional testing solution for the data fusion system.

SUMMARY OF THE INVENTION

In view of the above technical problem, a method and a device for generating simulation data, a computer device and a storage medium are provided, so as to reduce the cost of testing the data fusion system and improve the test flexibility.

A method for generating simulation data, including:
receiving user input through a user interface, where the user input includes a data type parameter, a value parameter, a generation time parameter and a target interface parameter of data to be generated;
searching for a pre-stored data template file corresponding to the data type parameter;
generating a data packet queue based on the value parameter by using the data template file; and
sending each data packet in the data packet queue to a target interface corresponding to the target interface parameter based on a sending moment specified by the generation time parameter.

In an embodiment, the searching for the pre-stored data template file corresponding to the data type parameter include:
searching for the data template file corresponding to the data type parameter from a data template file set.

The data template file set pre-stores data template files corresponding to various data type parameters, each of the data template files is for generating, based on a value determined by the value parameter, a data packet in a data format having the value and simulating data detected by a sensor represented by the data type parameter.

In an embodiment, the generating the data packet queue based on the value parameter by using the data template file includes:
generating a template data packet with a default value by using the data template file;
iteratively modifying, based on the value parameter, a value of a previously generated data packet by a value offset to determine a current data packet, to generate multiple data packets corresponding to the value parameter; and
sending the multiple data packets into the data packet queue in sequence.

In an embodiment, the iteratively modifying, based on the value parameter, the value of the previously generated data packet by the value offset to determine the current data packet, to generate the multiple data packets corresponding to the value parameter includes:
in a case that the value parameter includes information that a random value is not checked and includes no value specified by a user, iteratively modifying the value of the previously generated data packet by the value offset of 0 to determine the current data packet, so as to generate the multiple data packets with the default value;
in a case that the value parameter includes information that a random value is not checked and includes a value specified by a user, modifying the default value of the template data packet by the value offset that is a difference between the value specified by the user and the default value to determine the current data packet, and iteratively modifying the value of the previously generated data packet by the value offset of 0 to determine the current data packet, so as to generate the multiple data packets with the value specified by the user; and
in a case that the value parameter includes information that a random value is checked, acquiring a range of the random value in the value parameter; iteratively modifying the value of the previously generated data packet by the value offset that is the random value to determine the current packet on the premise that the current data packet is within the range of the random value, so as to generate the multiple data packets with the random value within the range.

In an embodiment, the sending each data packet in the data packet queue to the target interface corresponding to the target interface parameter based on the sending moment specified by the generation time parameter includes:

determining an initial sending moment and a sending interval based on the generation time parameter;

selecting a first data packet from the data packet queue, and sending the first data packet to the target interface corresponding to the target interface parameter based on the initial sending moment; and iteratively sending a current data packet to the target interface based on a sending moment determined by adding the sending interval to a sending moment of a previously sent data packet, until all the data packets in the data packet queue are sent.

In an embodiment, the user input further includes fault simulation information, and the value of the data packet and/or the sending moment of the data packet are modified based on the fault simulation information to simulate an influence of a fault corresponding to the fault simulation information on the value of the data packet and/or the sending moment of the data packet when generating and/or sending the data packet.

In an embodiment, the fault simulation information includes value fault simulation information, and where the generating the data packet queue based on the value parameter by using the data template file includes: generating the data packet queue based on the value parameter and the value fault simulation information by using the data template file, so that a value of the data packet in the data packet queue takes account of an influence difference of a value fault corresponding to the value fault simulation information on the value.

In an embodiment, the fault simulation information includes generation fault simulation information, and the sending each data packet in the data packet queue to the target interface corresponding to the target interface parameter based on the sending moment specified by the generation time parameter includes: sending the data packet in the data packet queue to the target interface corresponding to the target interface parameter based on the sending moment specified by the generation time parameter and the generation time fault simulation information, so that the sending moment of the data packet takes account of an influence difference of a generation time fault corresponding to the generation time fault simulation information on the sending moment.

A device for generating simulation data, including:

an input receiving module configured to receive user input through a user interface, where the user input includes a data type parameter, a value parameter, a generation time parameter and a target interface parameter of data to be generated;

a template search module configured to search for a pre-stored data template file corresponding to the data type parameter;

a data packet generating module configured to generate a data packet queue based on the value parameter by using the data template file; and a data packet sending module configured to send each data packet in the data packet queue to a target interface corresponding to the target interface parameter based on a sending moment specified by the generation time parameter.

A computer device includes a memory storing a computer program, and a processor. The processor is configured to execute the computer program to implement the method.

A computer-readable storage medium stores a computer program that, when being executed by a processor, implements the method.

With the method and the device for generating simulation data, the computer device and the computer-readable storage medium, data packets having corresponding sensor data format is generated based on the user input through a pre-stored data template file. These data packets are sent to the corresponding interface of the data fusion system based on the moments specified by the user input. Therefore, parameters such as the quantity, value, and generation time of sensor data inputted into the data fusion system for testing can be customized according to user needs, effectively improving the flexibility of available test data.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings.

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION OF THE INVENTION

Figure 1:
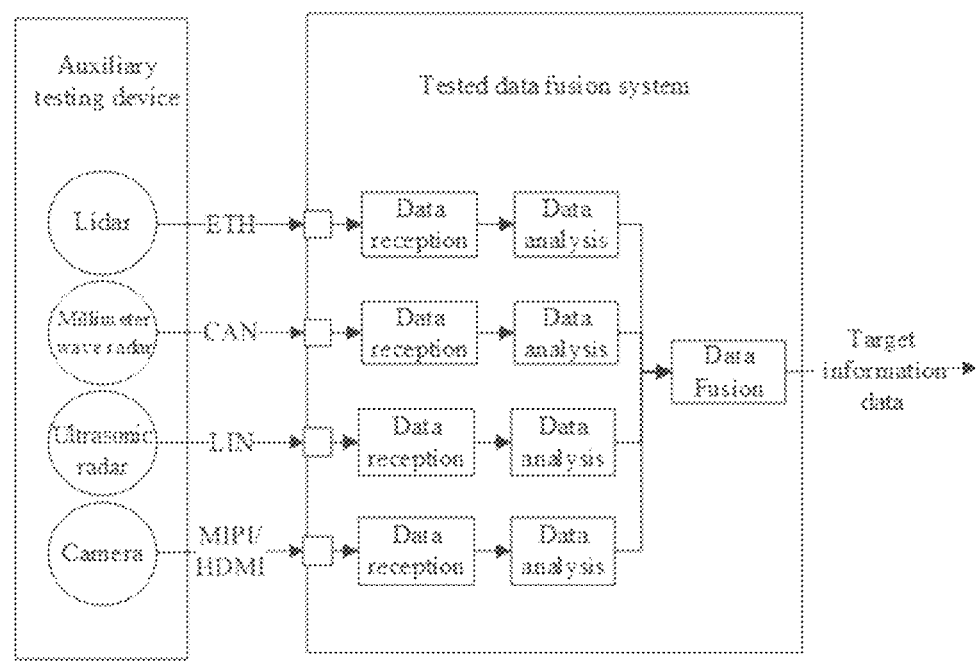
FIG. 1 is a schematic diagram illustrating the existing test system in an example.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112,916, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

In the following, the present application will be further described in detail in conjunction with the drawings and embodiments, so that the purpose, technical solutions and advantages of the present application are clearer. It should be understood that the specific embodiments described herein are only used to explain the present application rather than intended to limit the present application.

Figure 2:
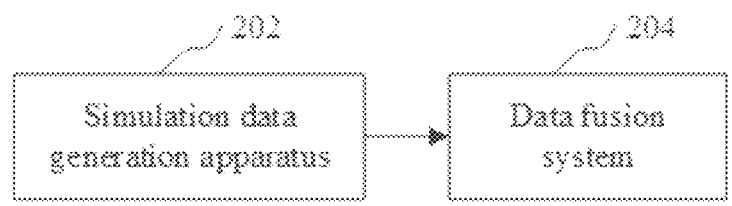
FIG. 2 is a schematic diagram illustrating an application environment of a method for generating simulation data according to an embodiment.

The method for generating simulation data according to the present application may be applied to the application scenario shown in FIG. 2. A simulation data generation apparatus 202 is connected to the tested data fusion system 204 through a corresponding interface. The data fusion system 204 may be provided with multiple types of interfaces, for example, in the examples shown in FIG. 1 or FIG. 6, including an ETH interface, a CAN interface, a LIN interface, and a MIPI/HDMI interface. The simulation data generation apparatus 202 for generating simulation data is connected to the data fusion system 204 through these interfaces. The simulation data generation apparatus 202 performs the method for generating simulation data in the embodiment of the present application to generate a data packet based on user input, and send the data packet to the data fusion system 204 through a corresponding interface for testing. The simulation data generation apparatus 202 may be implemented by, for example, a personal computer or a notebook computer. Therefore, no sensor or special device that is expensive is involved, and only a conventional computer can generate the required data packets and send them to the data fusion system 204 for testing the data fusion system 204, thereby effectively reducing the test cost.

Figure 3:
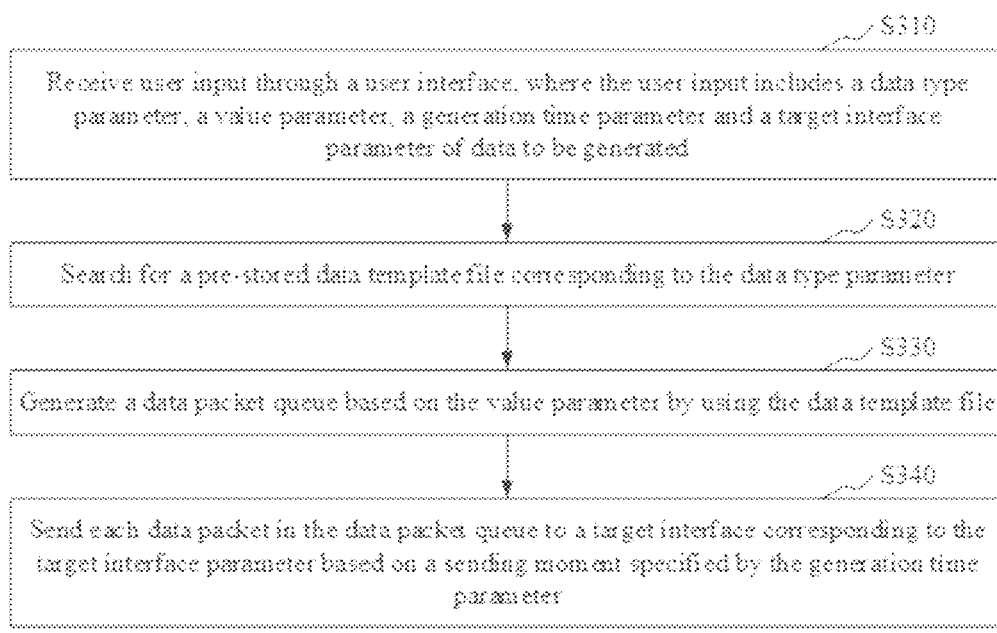
FIG. 3 is a schematic flow chart illustrating the method for generating simulation data according to an embodiment.

In an embodiment, as shown in FIG. 3, the method for generating simulation data is provided. The method is applied to the simulation data generation apparatus 202 in FIG. 2 as an example. The method includes the following steps S310 to S340.

In step S310, a user input is received through a user interface. The user input includes a data type parameter, a value parameter, a generation time parameter and a target interface parameter of data to be generated.

The user interface (UI) is an interface through which the simulation data generation apparatus 202 interacts with a user. The simulation data generation apparatus 202 may display the user interface on its display screen for the user to provide the user input to the simulation data generation apparatus 202 through an input device of the simulation data generation apparatus 202. For example, referring to FIG. 4, a specific example of the user interface displayed on the display screen is given.

There is a one-to-one correspondence between the data type parameters and the correspondingly generated sensor data formats. That is, in order to generate M data formats, M data type parameters are correspondingly defined, and M is a positive integer. For example, the data type parameter may be determined based on the sensor type, the sensor signal, and/or the sensor manufacturer, and the like. For example, sensor types may include the camera, the lidar, the ultrasonic radar, the millimeter wave radar and the like. Data generated by different types of sensors generally have different data formats, and accordingly different data type parameters are defined. In addition, sensors of the same sensor type from different manufacturers or in different models may also have different data formats, and therefore are defined as corresponding to different data type parameters. For example, the data generated by Company A's 16-line lidar, B's 64-line lidar, and C's 1080P camera have three different data formats, and three different data type parameters are defined accordingly. For example, in FIG. 4, the lidar 001, the lidar 002, the lidar 003, the millimeter wave radar 001, the millimeter wave radar 002, the millimeter wave radar 003, the ultrasonic radar 001, the ultrasonic radar 002, the ultrasonic radar 002, the camera 001, etc. and other device names, may refer to different data type parameters. The user may check the required device name in the drop-down list, so that the user input includes the corresponding data type parameter.

Figure 4:
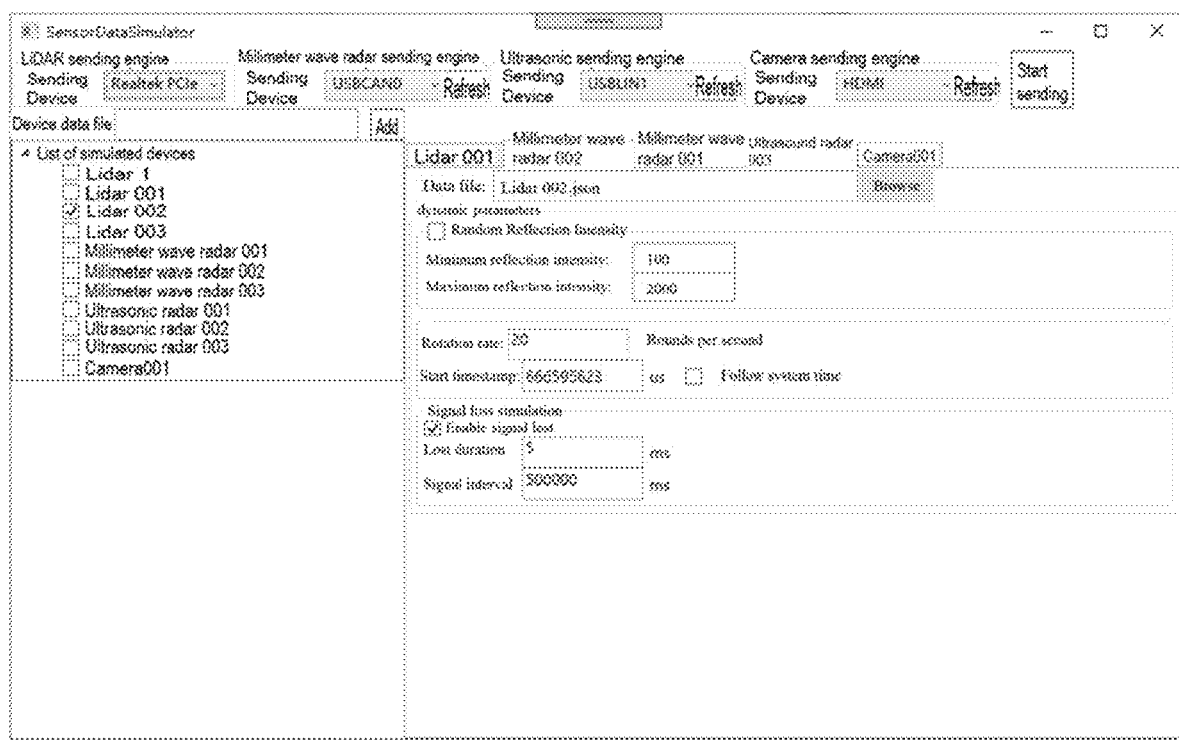
FIG. 4 is a schematic diagram illustrating a user interface according to an embodiment.

The value parameter is a related parameter used to define the size of the generated data packet, and may have different forms. For example, the value parameter may include information on whether to check a random value. When the value parameter includes the information that the random value is not checked, the value of the generated data packet may be a default value or a value specified by the user. The value specified by the user may also be included in the value parameter. When the value parameter includes information that the random value is checked, the value parameter may further include a random value range defined by a value upper limit and a value lower limit. Correspondingly, the value of the generated data packet may be a value randomly generated within the defined random value range. The random value of several data packets generated continuously in the random value range can simulate the fluctuation of the data collected by the sensor in the actual operation process, so that the values of the generated data packets are closer to the collected data in the actual operation process. For example, as shown in FIG. 4, for a selected lidar 002, an example of the random value is random reflection intensity. When the random reflection intensity is checked, the random value range is defined by minimum reflection intensity of 100 to maximum reflection intensity of 2000.

The generation time parameter may include a sending moment parameter. The sending moment parameter is a related parameter used to define an actual moment when each data packet in the data packet queue is expected to be outputted to the data fusion system. The sending moment parameters may include, for example, an initial sending moment and a sending interval. Further, the generation time parameter may also include a simulation generation time parameter. The simulation generation time parameter is used to define a simulation generation time stamp to be written for each data packet in the data packet queue. For example, for a data packet, the sending moment specified by the sending moment parameter is a moment A, and the simulation generation time stamp specified by the simulation generation time parameter is a moment B. Then the data packet will be sent to the data fusion system at the moment A, but the generation time stamp of the data packet will be written as the moment B. When reading the data packet, the data fusion system may consider that the collected data in the data packet is collected at the moment B, so as to simulate the data at any moment based on the simulation generation time parameter. For example, referring to FIG. 4, for the checked lidar 002, the start time stamp of 666595623 μs defines the initial sending moment, and the rotation rate of 20 rounds per second defines the sending interval.

The target interface parameter is a related parameter used to define an interface through which the data is sent to the data fusion system. The target interface parameter depends on the sensor type. For example, the lidar corresponds to the ETH interface, the millimeter wave radar corresponds to the CAN interface, the ultrasonic radar corresponds to the LIN interface, and the camera corresponds to the MIPI/HDMI interface. In some embodiments, when multiple interfaces may be available for a sensor type, one of the available interfaces is specified by user input.

In step S320, a pre-stored data template file corresponding to the data type parameter is found.

Before this step, the user or the developer may pre-store data template files corresponding to various data type parameters in the simulation data generation apparatus 202. The data template file may be defined according to the data format defined in the product manual of the sensor to be simulated. For example, which data fields are included in the data format and the types of each data field, such as string, bool, int, etc. are defined. Therefore, each data template file can be used to generate a data packet in a data format corresponding to the data type parameter, so as to replace the data packet outputted by the real sensor.

In an embodiment, step S320 includes: searching for the data template file corresponding to the data type parameter from a data template file set. The data template file set pre-stores data template files corresponding to various data type parameters. Each of the data template files is used to generate, based on the value determined by the value parameter, a data packet in a data format having the value and simulating the data detected by the sensor represented by the data type parameter.

In step S330, the data packet queue is generated by using the data template file based on the value parameter.

In an embodiment, the step S330 includes: generating a template data packet with a default value by using the data template file; iteratively modifying, based on the value parameter, the value of the previously generated data packet by a corresponding value offset to determine a current data packet, so as to generate multiple data packets corresponding to the value parameter; and sending the multiple data packets into the data packet queue in sequence.

Further, in the above embodiment, the repeatedly modifying, based on the value parameter, the value of the previously generated data packet by a corresponding value offset to determine a current data packet includes: when the value parameter includes the information that the random value is not checked and includes no value specified by the user, modifying the value of the previously generated data packet by the value offset of 0 (i.e., the value of the previously generated packet remains unchanged) to determine the current data packet iteratively, so as to generate multiple data packets with the default value.

When the value parameter includes the information that the random value is not checked and a value specified by the user, the default value of the template data packet is modified by the value offset that is a difference between the user-specified value and the default value to determine the current data packet, and the value of the previously generated data packet is modified by the value offset of 0 to determine the current packet iteratively, so as to the generate the multiple data packets with the user-specified value.

When the value parameter includes the information that the random value has been checked, the range of the random value in the value parameter is obtained. The value of the previously generated data packet is modified by the value offset that is the random value to determine the current packet on the premise that the current data packet is within the range of the random value iteratively, so as to generate the multiple data packets with the random value within the range.

In the above embodiment, on the basis of the previous generated data packet, it is unnecessary to generate the current data packet from the scratch by using the data template file. Instead, the value of the previous generated data packet is directly modified by the required value offset to obtain the current data packet more quickly. However, in an alternative embodiment, each current data packet with the desired value is generated by using the data template file.

Figure 5:
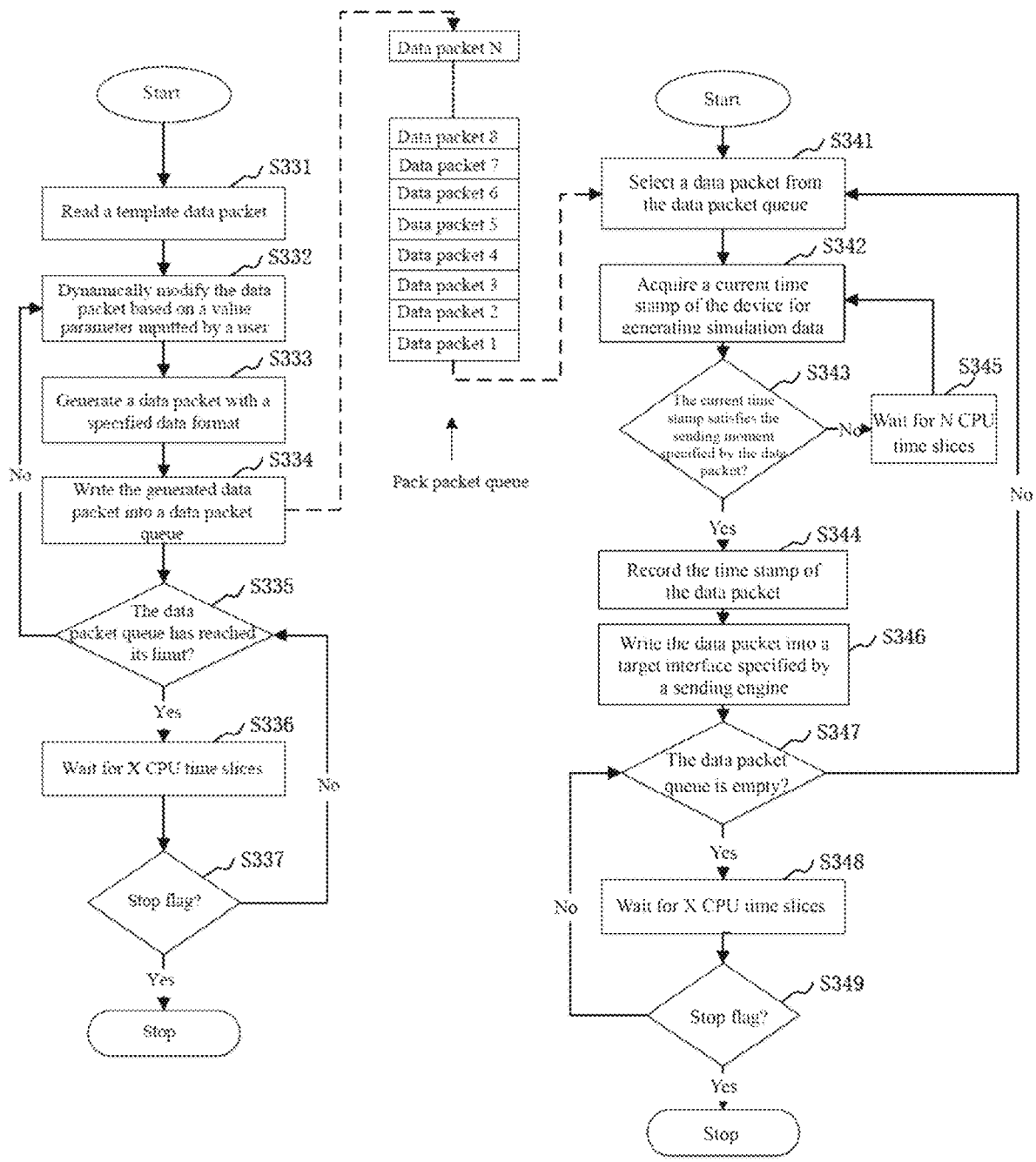
FIG. 5 is a schematic flow diagram illustrating steps performed on a first thread and a second thread according to an embodiment.

FIG. 5 shows a specific example of step S330 and step S340. In FIG. 5, step S330 and step S340 are performed on a first thread and a second thread respectively. On the first thread, step S330 includes the following steps S331 to S337.

In S331, the template data packet is read.

The template data packet will not be sent to the data packet queue.

In S332, the data packet is dynamically modified based on the value parameter inputted by the user.

In S333, a data packet with a specified data format is generated.

In S334, the generated data packet is written into the data packet queue.

In this step, all data packets generated based on the value parameter inputted by the user are sequentially written into the data packet queue for sending, except the template data packet.

In S5335, it is determined whether the data packet queue has reached its limit? If the data packet queue has reached the limit, the method proceeds to step S336. If the data packet queue has not reached the limit, the method returns to step S332.

In S336, X CPU time slices pass.

In S337, it is determined whether there is a stop flag? The current process stops in case of the stop flag. If there is no stop flag, the method returns to step S335.

The stop flag is a software global variable. There are two sources that trigger the stop flag. The first one is that all the data packets specified to be written to the queue have been written. The second one is from triggering a stop button on the user interface.

In step S340, data packets in the data packet queue are sent to the target interface corresponding to the target interface parameter based on the sending moments specified by the generation time parameter.

In an embodiment, step S340 includes: determining the initial sending moment and a sending interval based on the generation time parameter; selecting the first data packet from the data packet queue, and sending the first data packet to the target interface corresponding to the target interface parameter based on the initial sending moment; and iteratively sending the current data packet to the target interface based on a sending moment determined by adding the sending interval to the sending moment of the previously sent data packet, until all the data packets in the data packet queue are sent.

For example, referring to FIG. 5, on the second thread, step S340 includes the following steps S341 to S349.

In S341, a data packet is selected from the data packet queue.

In S342, a current time stamp of the device for generating simulation data is acquired.

In S343, it is determined whether the current time stamp satisfies the sending moment specified by the data packet? If the current time stamp meets the sending moment specified by the data packet, the method proceeds to step S344. If the current time stamp does not meet the sending moment specified by the data packet, the method proceeds to step S345 and returns to step S342 after waiting for N CPU time slices.

For the first data packet in the data packet queue, it is determined whether the current system time stamp meets the specified sending moment, that is, it is determined whether the current system time stamp meets the initial moment. For other data packets after the first data packet, it is determined whether the current system timestamp meets the specified sending moment. It may be directly determined whether the current system timestamp meets the specified sending moment. Alternatively, it is determined whether the time difference between the time stamp of the sending moment of the last data packet and the current system time stamp satisfies the sending interval.

In S344, the time stamp of the current data packet is recorded.

In this step, the time stamp is written into the current packet. When the simulation generation time parameter is not specified in the generation time parameter, the time stamp written in the current data packet may be the sending moment when the current data packet is actually sent. When the simulation generation time parameter has been specified in the generation time parameter, the time stamp written in the current data packet is the simulation generation time stamp of the current data packet specified by the simulation generation time parameter.

In S346, the current data packet is written into the target interface specified by the sending engine.

In S347, is it determined whether the data packet queue is empty? If the packet queue is empty, the method proceeds to step S348. If the data packet queue is not empty, the method returns to step S341.

In S348, X CPU time slices pass.

In S349, it is determined whether there is a stop flag? The current process stops in case of the stop flag. If there is no stop flag, the method returns to step S347.

The stop flag is a software global variable. There are two sources that trigger the stop flag. The first one is that all the data packets specified to be sent have been sent. The second one is triggering the stop button of the user interface.

The values of X and N may be determined according to the generation time interval. For example, for a 1 MHz CPU, an interval of 1 ms is equivalent to waiting for 1000 CPU time slices.

In the above method for generating simulation data, data packets having corresponding sensor data format is generated based on the user input through a pre-stored data template file. These data packets are sent to the corresponding interface of the data fusion system 204 based on the moments specified by the user input. Therefore, parameters such as the quantity, value, and generation time of sensor data inputted into the data fusion system 204 for testing can be customized according to user needs, effectively improving the flexibility of available test data.

In an embodiment, the user input includes fault simulation information in addition to the data type parameter, the value parameters, the generation time parameter and the target interface parameter. When generating and/or sending the data packet, that is, when performing the above steps S330 and/or S340, the value of the data packet and/or the sending moment of the data packet are modified based on the fault simulation information, so as to simulate the influence of the fault corresponding to the fault simulation information on the value of the data packet and/or the sending moment of the data packet.

In an embodiment, the fault simulation information may include value fault simulation information and/or generation time fault simulation information.

For example, as shown in FIG. 4, the user inputs parameters in the signal loss simulation column (for example, the loss duration is 5 ms, and the signal interval time of the lost signal is 500000 ms), so as to simulate the fault condition of the signal loss. The user may choose whether to perform fault simulation, for example, by checking whether to enable the signal loss item. When the user checks the enable signal loss item, the user input then includes the fault simulation information. When the user does not check the enable signal loss item, the user input may not include fault simulation information. It can be understood that the signal loss is only an exemplary fault, and simulations of different fault types may be designed as needed.

In an embodiment, when the fault simulation information includes the value fault simulation information, the above step S330 may include: generating the data packet queue based on the value parameter and the value fault simulation information by using the data template file, so that the value of the data packet in the data packet queue takes account of the influence difference of the value fault corresponding to the value fault simulation information on the value.

In an embodiment, when the fault simulation information includes the generation time fault simulation information, the step S340 includes: sending the data packet in the data packet queue to the target interface corresponding to the target interface parameter based on the sending moment specified by the generation time parameter and the generation time fault simulation information, so that the sending moment of the data packet takes account of an influence difference of the generation time fault corresponding to the generation time fault simulation information on the sending moment.

In the above embodiment, the user input also includes the fault simulation information, and the value or sending moment of the generated data packet is modified accordingly based on the fault simulation information. Therefore, the data outputted by the sensor under various fault conditions are simulated, thereby further improving the flexibility of providing data to the data fusion system and improving the test flexibility and efficiency.

It should be understood that although the various steps in the flow chart of FIG. 3 are displayed sequentially as indicated by the arrows. However, these steps are not necessarily performed sequentially in the order indicated by the arrows. Unless otherwise specified herein, these steps may be performed in different order rather than necessarily performed in an order strictly. At least some of the steps in FIG. 3 may include multiple sub-steps or multiple stages. These sub-steps or stages may be performed at different times rather than necessarily performed at the same time. These sub-steps or stages may be performed alternately or alternately with at least a part of other steps or sub-steps or stages of other steps instead of necessarily performed sequentially.

Figure 6:
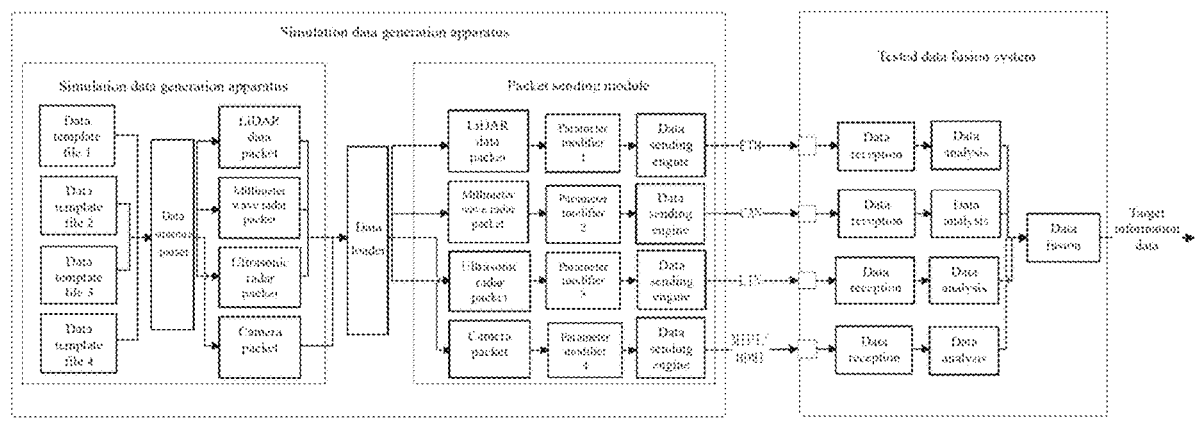
FIG. 6 is a structural block diagram illustrating a device for generating simulation data according to an embodiment.

FIG. 6 is a structural block diagram illustrating a simulation data generation apparatus 202. The simulation data generation apparatus 202 may include a data packet generating module and a data packet sending module.

The data packet generating module calls the pre-stored data template file through a data format parser (where the data template file defines data formats of sensors of different sensor types or data formats of sensors of different manufacturers or models of the same sensor type), and generate a template data packet of a sensor based on the default value parameter in the data packet generating system, for example, the 16-line lidar data packet of a company A, the 64-line lidar data packet of a company B, and the 1080P camera data packet of a company C.

The data packet sending module loads the template data packet into a memory. The parameter modifier dynamically modifies the value of the corresponding value offset in the data packet to be sent based on the value parameter specified by the user in the data packet sending system, so as to generate multiple data packets. The generated data packets are sequentially sent to the data packet queue of the data sending engine. The data sending engine sequentially sends the data packets in the data packet queue to the designated physical interface (e.g., Ethernet port, LIN port, CAN port, etc.) according to the specified sending moments (determined based on the time interval and time stamp). The data packet sending module sequentially writes the data packets into the specified target interface through the first thread for dynamic modification of the data packets and the second thread for timing sending of data packets, so as to generate simulation data that approximates the data detected by real sensors. In the case that the user has input the fault simulation information, real scenarios such as signal interference or signal loss are intermittently implanted to test and verify the robustness of the data fusion system and whether the downgrade/upgrade fusion strategy of data fusion is correct.

When using the simulation data generation apparatus 202 shown in FIG. 6, the user performs operations on the user interface shown in FIG. 4 through the following steps 1) to 6) to generate desired data.

1) The data template file is defined according to a manual of a product to be simulated.
2) The user, via the data packet generating module of this system, selects the data template file and related parameters on the user interface, and clicks start generating to generate the template data packet.
3) The data module of this system loads the template data packet.
4) The user dynamically modifies the parameters and selects the sending port or destination address.
5) The user adds multiple data nodes to be sent by repeating steps 2 to 4.
6) The user clicks start sending.

In the existing data generation system shown in FIG. 1, a real sensor is used to test the data fusion capability of the data fusion system. Taking the lidar as an example, a 16-line lidar costs tens of thousands of yuan and a 64-line lidar costs hundreds of thousands of yuan. Sensors from different manufacturers have different data formats. The data fusion system has different parsing capabilities for different data formats. Therefore, in order to be compatible with the data measured by sensors from various manufacturers, multiple sensors are purchased, plus multiple ultrasonic radars, millimeter wave radars, and multiple cameras, resulting in high costs for building a test system.

The device for generating simulation data in the present application simulates sensor data in various data formats through different data template files. Also taking the lidar with the largest amount of data as an example, the current data volume of the 16-line lidar is about 100 Mbit/s, and the data volume of the 64-line lidar is not more than 500 Mbit/s. In addition, currently commonly used personal computers have integrated 1000M network cards. Therefore, this system can generate the simulation data of a variety of sensors with a large flow rate on an ordinary personal computer, thereby effectively reducing the test cost.

In addition, as discussed in the above embodiments, the system can also customize various fault data for processing by the data fusion system to be tested, thereby improving the flexibility and efficiency of the test.

Figure 7:
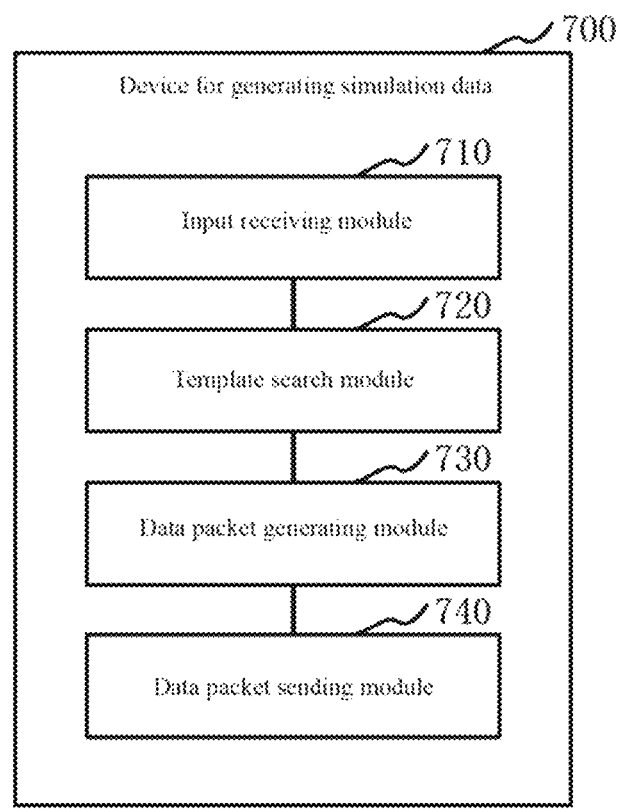
FIG. 7 is a structural block diagram illustrating a device for generating simulation data according to an embodiment.

In an embodiment, as shown in FIG. 7, a device 700 for generating simulation data is provided. The device 700 is included in the simulation data generation apparatus 202. The device 700 includes an input receiving module 710, a template search module 720, a data packet generating module 730 and a data packet sending module 740.

The input receiving module 710 is configured to receive user input through a user interface. The user input includes a data type parameter, a value parameter, a generation time parameter and a target interface parameter of data to be generated.

The template search module 720 is configured to search for a pre-stored data template file corresponding to the data type parameter.

The data packet generating module 730 is configured to generate a data packet queue based on the value parameter by using the data template file.

The data packet sending module 740 is configured to send each data packet in the data packet queue to the target interface corresponding to the target interface parameter based on a sending moment specified by the generation time parameter.

Details about the device 700 can refer to the above description of the method for generating simulation data, and thus are not described here. The modules in the device 700 may be fully or partially implemented by software, hardware or a combination thereof. The modules may be embedded in or independent of the processor in the computer device in the form of hardware, and may also be stored in the memory of the computer device in the form of software, so that the processor can perform the corresponding operations of the above modules.

Figure 8:
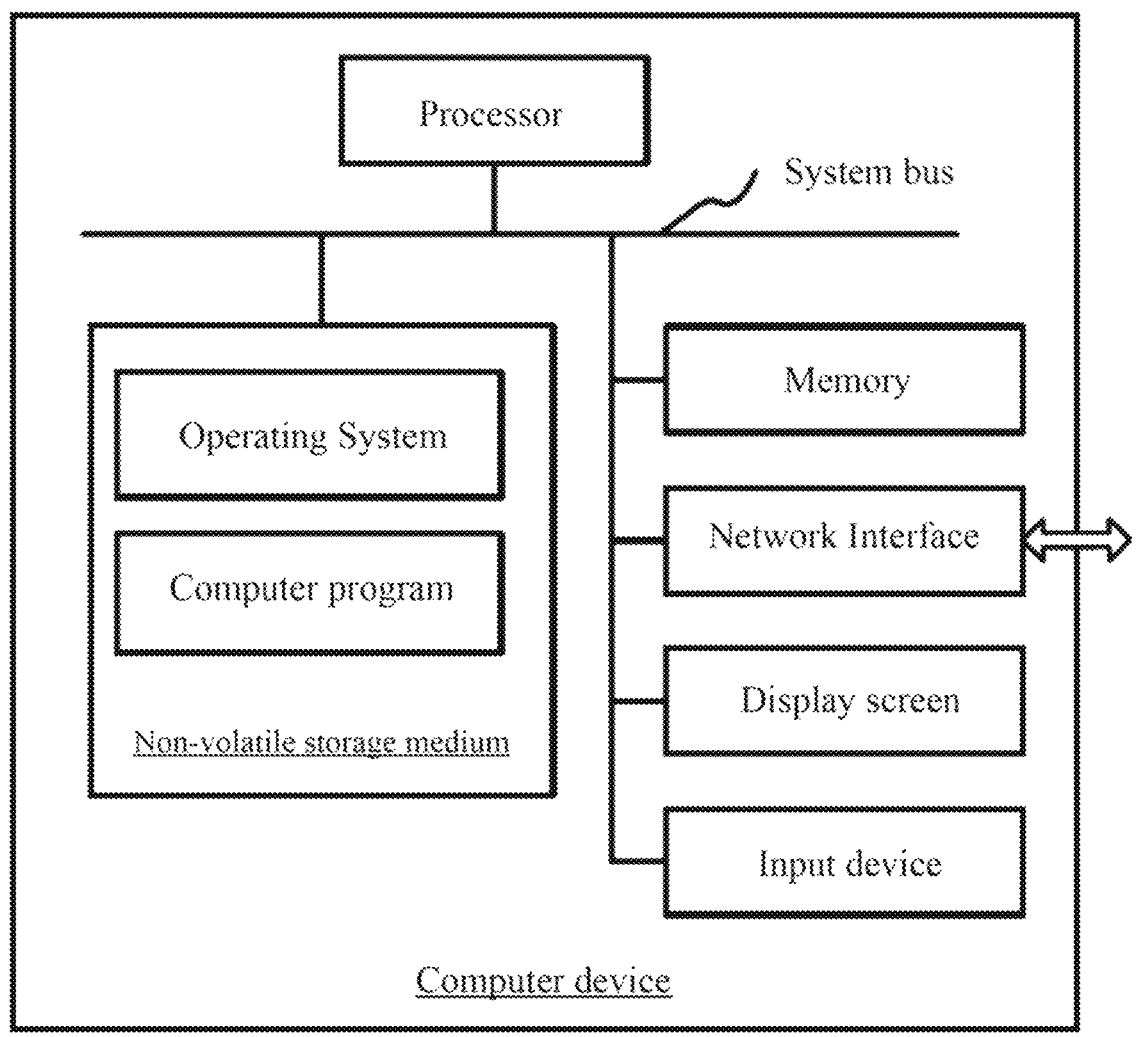
FIG. 8 is a structural block diagram illustrating a computer device according to an embodiment.

A computer device is provided according to an embodiment. The computer device is configured to implement the apparatus for generating simulation data according to the present application, as shown in FIG. 8. The computer device includes a processor, a memory, a network interface, a display screen and an input device that are connected through a system bus. The processor of the computer device is capable of computing and controlling. The memory of the computer device includes a non-volatile storage medium and an internal memory. The non-volatile storage medium stores an operating system and computer programs. The internal memory provides an environment for the operation of the operating system and computer programs in the non-volatile storage medium. The network interface of the computer device is configured to communicate with an external terminal via a network connection. The computer programs, when executed by a processor, implement the method for generating simulation data. The display screen of the computer device may be a liquid crystal display screen or an electronic ink display screen. The input device of the computer device may be a touch layer covered on the display screen, a button, a trackball or a touch pad arranged on the casing of the computer device, or an external keyboard, touch pad or mouse.

Those skilled in the art should understand that the structure shown in FIG. 8 is only a block diagram of a partial structure related to the solution of the present application, rather than constitute a limitation on the computer device to which the solution of the present application is applied. In practice, the computer device may include more or fewer components than shown in the drawings, or combine certain components, or have a different arrangement of components.

A computer device is provided according to an embodiment. The computer device includes a memory and a processor. The memory stores a computer program. The processor, when executing the computer program, implements the following steps:

receiving user input through a user interface, where the user input includes a data type parameter, a value parameter, a generation time parameter and a target interface parameter of data to be generated;

searching for a pre-stored data template file corresponding to the data type parameter;

generating a data packet queue based on the value parameter by using the data template file; and sending each data packet in the data packet queue to the target interface corresponding to the target interface parameter based on a sending moment specified by the generation time parameter.

In other embodiments, the processor, when executing the computer programs, also implements the steps of the method for generating simulation data in any of the above embodiments.

In an embodiment, a computer-readable storage medium is provided, on which a computer program is stored. The computer program, when executed by a processor, implements the following steps:

receiving user input through a user interface, where the user input includes a data type parameter, a value parameter, a generation time parameter and a target interface parameter of data to be generated;

searching for a pre-stored data template file corresponding to the data type parameter;

generating a data packet queue based on the value parameter by using the data template file; and sending each data packet in the data packet queue to the target interface corresponding to the target interface parameter based on a sending moment specified by the generation time parameter.

In other embodiments, the computer program, when executed by the processor, also implements the steps of the method for generating simulation data in any of the above embodiments.

Those skilled in the art should understand that all or part of the processes in the method of the above embodiments may be implemented by a computer program instructing related hardware. The computer program may be stored in a non-volatile computer-readable storage medium. When the computer program is executed, steps in the embodiments of the above method are performed. Any of the memory, storage, database or other media used in the various embodiments of the application may include non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random-access memory (RAM) or external cache memory. For illustration instead of limitation, the RAM may be in many forms such as a static RAM (SRAM), a dynamic RAM (DRAM), a synchronous DRAM (SDRAM), a double data rate SDRAM (DDRSDRAM), an enhanced SDRAM (ESDRAM), a synch-link DRAM (SLDRAM), a memory bus (Rambus) a direct RAM (RDRAM), a direct memory bus dynamic RAM (DRDRAM), and a memory bus dynamic RAM (RDRAM), etc.

The technical features of the above embodiments may be combined arbitrarily. For the sake of brevity, not all possible combinations of the technical features in the above embodiments are described. However, any combination of these technical features should be regarded as within the scope described in the present specification if there is no contradiction.

The examples described above represent only a few implementations of the present application. Although specific and detailed, the description should not be construed as limiting the patent scope of the invention. It should be noted that those skilled in the art can make several modifications and improvements without departing from the concept of the present application, and these all belong to the protection scope of the present application. Therefore, the protection scope of the patent application should be based on the appended claims.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

The invention claimed is:

1. A simulated data generation method for autonomous vehicle sensor testing, comprising:

receiving a user input through a user interface, wherein the user input comprises a data type parameter, a value parameter, a generation time parameter, and a target interface parameter of data to be generated, and the data type parameters specify a type of autonomous vehicle sensor;

searching for a pre-stored data template file corresponding to the data type parameter, wherein the template file is adapted to a data format of a target sensor:

generating a data packet queue based on the value parameter by using the data template file; and sending each data packet in the data packet queue to a target interface corresponding to the target interface parameter based on a sending moment specified by the generation time parameter.

2. The method according to claim 1, wherein searching for the pre-stored data template file corresponding to the data type parameter comprises:

searching for the data template file corresponding to the data type parameter from a data template file set, wherein the data template file set pre-stores data template files corresponding to various data type parameters, each of the data template files is for generating, based on a value determined by the value parameter, one data packet in a data format having the value and simulating data detected by a sensor represented by the data type parameter.

3. The method according to claim 1, wherein generating the data packet queue based on the value parameter by using the data template file comprises:

generating a template data packet with a default value by using the data template file;

iteratively modifying, based on the value parameter, a value of a previously generated data packet by a value offset to determine a current data packet, to generate a plurality of data packets corresponding to the value parameter; and sending the plurality of data packets into the data packet queue in sequence.

4. The method according to claim 3, wherein the iteratively modifying, based on the value parameter, the value of the previously generated data packet by the value offset to determine the current data packet, to generate the plurality of data packets corresponding to the value parameter comprises:

iteratively modifying the value of the previously generated data packet by the value offset of 0 to determine the current data packet to generate the plurality of data packets with the default value based on a case that the value parameter comprises information that a random value is not checked and comprises no value specified by a user;

modifying the default value of the template data packet by the value offset that is a difference between the value specified by the user and the default value to determine the current data packet, and iteratively modifying the value of the previously generated data packet by the value offset of 0 to determine the current data packet, so as to generate the plurality of data packets with the value specified by the user based on a case that the value parameter comprises information that a random value is not checked and comprises a value specified by a user; and iteratively modifying the value of the previously generated data packet by the value offset that is the random value to determine the current packet on the premise that the current data packet is within the range of the random value, so as to generate the plurality of data packets with the random value within the range based on a case that the value parameter comprises information that a random value is checked, acquiring a range of the random value in the value parameter.

5. The method according to claim 1, wherein sending each data packet in the data packet queue to the target interface corresponding to the target interface parameter based on the sending moment specified by the generation time parameter comprises:

determining an initial sending moment and a sending interval based on the generation time parameter;

selecting a first data packet from the data packet queue, and sending the first data packet to the target interface corresponding to the target interface parameter based on the initial sending moment; and iteratively sending a current data packet to the target interface based on a sending moment determined by adding the sending interval to a sending moment of a previously sent data packet, until all the data packets in the data packet queue are sent.

6. The method according to claim 1, wherein the user input further comprises fault simulation information, and the value of the data packet and/or the sending moment of the data packet are modified based on the fault simulation information to simulate an influence of a fault corresponding to the fault simulation information on the value of the data packet and/or the sending moment of the data packet when generating and/or sending the data packet.

7. The method according to claim 6, wherein the fault simulation information comprises value fault simulation information, and wherein the generating the data packet queue based on the value parameter by using the data template file comprises:

generating the data packet queue based on the value parameter and the value fault simulation information by using the data template file, so that a value of the data packet in the data packet queue takes account of an influence difference of a value fault corresponding to the value fault simulation information on the value.

8. The method according to claim 6, wherein the fault simulation information comprises generation fault simulation information, and wherein the sending each data packet in the data packet queue to the target interface corresponding to the target interface parameter based on the sending moment specified by the generation time parameter comprises:

sending the data packet in the data packet queue to the target interface corresponding to the target interface parameter based on the sending moment specified by the generation time parameter and the generation time fault simulation information, so that the sending moment of the data packet takes account of an influence difference of a generation time fault corresponding to the generation time fault simulation information on the sending moment.

9. A device for generating simulation data, comprising:

an input receiving module processor configured to receive user input through a user interface, wherein the user input comprises a data type parameter, a value parameter, a generation time parameter and a target interface parameter of data to be generated;

a template search module processor configured to search for a pre-stored data template file corresponding to the data type parameter;

a data packet generating module processor configured to generate a data packet queue based on the value parameter by using the data template file; and a data packet sending module processor configured to send each data packet in the data packet queue to a target interface corresponding to the target interface parameter based on a sending moment specified by the generation time parameter.

10. A computer device, comprising:

a memory storing a computer program; and a processor configured to execute the computer program to implement the method comprising:

receiving user input through a user interface, wherein the user input comprises a data type parameter, a value parameter, a generation time parameter and a target interface parameter of data to be generated, and the data type parameters specify a type of autonomous vehicle sensor;

searching for a pre-stored data template file corresponding to the data type parameter, wherein the template file is adapted to a data format of a target sensor;

generating a data packet queue based on the value parameter by using the data template file; and sending each data packet in the data packet queue to a target interface corresponding to the target interface parameter based on a sending moment specified by the generation time parameter.

11. A non-transitory computer-readable storage medium, storing a computer program that, when being executed by a processor, implements the method comprising:

receiving user input through a user interface, wherein the user input comprises a data type parameter, a value parameter, a generation time parameter and a target interface parameter of data to be generated, and the data type parameters specify a type of autonomous vehicle sensor;

searching for a pre-stored data template file corresponding to the data type parameter, wherein the template file is adapted to a data format of a target sensor, generating a data packet queue based on the value parameter by using the data template file; and sending each data packet in the data packet queue to a target interface corresponding to the target interface parameter based on a sending moment specified by the generation time parameter.

* * * * *